United States Patent [19]

Randall

[11] Patent Number: 5,981,406
[45] Date of Patent: Nov. 9, 1999

[54] GLASS MAT WITH REINFORCING BINDER

[75] Inventor: Brian G. Randall, Lawrenceville, Ga.

[73] Assignee: G-P Gypsum Corporation, Atlanta, Ga.

[21] Appl. No.: 09/012,717

[22] Filed: Jan. 23, 1998

Related U.S. Application Data

[62] Division of application No. 08/297,505, Aug. 29, 1994, Pat. No. 5,718,785, which is a division of application No. 08/137,695, Oct. 15, 1993, Pat. No. 5,342,680, which is a continuation of application No. 07/432,122, Nov. 6, 1989, abandoned, which is a division of application No. 07/141,998, Jan. 6, 1988, Pat. No. 4,879,173.

[51] Int. Cl.$^6$ .............................. B32B 13/02; B32B 13/04
[52] U.S. Cl. ..................... 442/71; 428/294.7; 428/297.1; 428/297.4; 428/300.7; 428/301.4
[58] Field of Search .............................. 428/294.7, 297.1, 428/297.4, 300.7, 301.4; 442/71

[56] References Cited

U.S. PATENT DOCUMENTS

| | | |
|---|---|---|
| 1,787,163 | 12/1930 | New . |
| 2,206,042 | 7/1940 | Novak . |
| 2,238,017 | 4/1941 | Duncan . |
| 2,560,521 | 7/1951 | Camp . |
| 2,633,441 | 3/1953 | Buttress . |
| 2,954,302 | 9/1960 | Gorman, Jr. . |
| 3,185,297 | 5/1965 | Rutledge . |
| 3,284,980 | 11/1966 | Dinkel . |
| 3,289,371 | 12/1966 | Pearson et al. . |
| 3,391,037 | 7/1968 | McNulty . |
| 3,607,486 | 9/1971 | Jacks et al. . |
| 3,830,687 | 8/1974 | Re et al. . |
| 3,929,947 | 12/1975 | Schwartz . |
| 3,935,021 | 1/1976 | Greve et al. . |
| 3,941,632 | 3/1976 | Swedenberg et al. . |
| 3,944,698 | 3/1976 | Dierks et al. . |
| 3,947,398 | 3/1976 | Williams . |
| 3,993,822 | 11/1976 | Knauf et al. . |
| 4,020,237 | 4/1977 | von Hazmburg . |
| 4,047,355 | 9/1977 | Knorr . |
| 4,065,333 | 12/1977 | Lawlis et al. . |
| 4,065,597 | 12/1977 | Gillespie . |
| 4,073,997 | 2/1978 | Richards et al. . |
| 4,128,699 | 12/1978 | Kole et al. . |
| 4,148,781 | 4/1979 | Narukawa et al. . |
| 4,181,767 | 1/1980 | Steinau . |
| 4,187,130 | 2/1980 | Kautz . |
| 4,195,110 | 3/1980 | Dierks et al. . |
| 4,203,788 | 5/1980 | Clear . |
| 4,242,406 | 12/1980 | El Bouhnini et al. . |
| 4,265,979 | 5/1981 | Baehr et al. . |
| 4,296,169 | 10/1981 | Shannon . |
| 4,303,722 | 12/1981 | Pilgrim . |
| 4,324,082 | 4/1982 | Rutkowski et al. . |
| 4,335,177 | 6/1982 | Takeuchi . |
| 4,344,804 | 8/1982 | Bijen et al. . |
| 4,344,910 | 8/1982 | Bijen . |
| 4,351,867 | 9/1982 | Mulvey et al. . |
| 4,361,616 | 11/1982 | Bomers . |
| 4,364,212 | 12/1982 | Pearson et al. . |
| 4,378,405 | 3/1983 | Pilgrim . |
| 4,403,006 | 9/1983 | Bruce et al. . |
| 4,477,300 | 10/1984 | Pilgrim . |
| 4,504,533 | 3/1985 | Altenhofer et al. . |
| 4,647,496 | 3/1987 | Lehnert et al. ......................... 428/251 |
| 5,148,645 | 9/1992 | Lehnert et al. . |

FOREIGN PATENT DOCUMENTS

| | | |
|---|---|---|
| 721719 | 11/1965 | Canada . |
| 794590 | 9/1968 | Canada . |
| 993779 | 7/1976 | Canada . |
| 1 033 133 | 6/1958 | Germany . |
| 1 223 287 | 8/1966 | Germany . |
| 1 509 853 | 4/1970 | Germany . |
| 2 008 744 | 9/1971 | Germany . |
| 78 06 114 | 4/1979 | Germany . |
| 28 08 723 | 9/1979 | Germany . |
| 155679 | 12/1971 | New Zealand . |
| 772581 | 4/1957 | United Kingdom . |
| 1204541 | 9/1970 | United Kingdom . |
| 1520241 | 8/1978 | United Kingdom . |
| 2004807 | 4/1979 | United Kingdom . |
| 2103563 | 8/1979 | United Kingdom . |

OTHER PUBLICATIONS

"Fire Resistant Gypsum Sheathing", (undated), Brochure No. GA–252–84 of the Gypsum Association.
"Glasfaservliese" (Glass Fibre Mats) by J. Hansmann.
News Bulletin of the Exterior Insulation Manufacturers Association, Spring, 1982, Fall, 1982, and Winter, 1983.
Modern Plastics, "Opportunity Knocks—And Loudly—For Extruded PS Foam Board", Dec. 1978, pp. 46–47.

*Primary Examiner*—Richard Weisberger
*Attorney, Agent, or Firm*—Synnestvedt & Lechner LLP

[57] ABSTRACT

In a gypsum board faced with a fibrous mat, for example, a mat of glass filaments adhesively bound together, improvements are realized by the use of a reinforcing binder in the mat.

4 Claims, No Drawings

GLASS MAT WITH REINFORCING BINDER

This is a divisional application of U.S. application Ser. No. 08/297,505, filed Aug. 29, 1994, now U.S. Pat. No. 5,718,785, which is a division of U.S. application Ser. No. 08/137,695, filed Oct. 15, 1993, now U.S. Pat. No. 5,342,680, which is a continuation of U.S. application Ser. No. 07/432,122, filed Nov. 6, 1989, now abandoned, which is a division of U.S. application Ser. No. 07/141,998, filed Jan. 6, 1988, now U.S. Pat. No. 4,879,173.

FIELD OF THE INVENTION

This invention relates to an improved fibrous mat of the type that can be used as a facing material for gypsum board.

Panels of gypsum wallboard having a core of set gypsum sandwiched between two sheets of facing paper have long been used as structural members in the fabrication of buildings where the panels are used to form the partitions or walls of rooms, elevator shafts, stair wells, ceilings and the like. Although paper sheets have long been used as the facing material for gypsum board, there are prior art disclosures which suggest the use of other kinds of facing materials for gypsum board. For example, Canadian Patent No. 993,779 and U.S. Pat. No. 3,993,822 disclose gypsum boards having facing sheets of glass fibers. More particularly, the Canadian patent discloses gypsum board comprising a set gypsum core sandwiched between two glass fiber mats which are porous and dimensionally stable in the presence of moisture. The mats are adhered to the core by portions of the set gypsum which comprises the core. It is believed that the developments described in the aforementioned patents were never commercialized.

A more recent development in the field of gypsum board is the subject of U.S. Pat. No. 4,647,496 to C. W. Lehnert and B. G. Randall, assigned to the same assignee as the present invention. This patent discloses improved forms of fibrous mat-faced gypsum board which have been commercialized and which are presently being used effectively in more and more applications. These include applications in which paper-faced gypsum board is considered unsuitable for use and certain applications where it has been recognized that the fibrous mat-faced gypsum board can be used to better advantage than paper-faced board.

A preferred form of the gypsum board described in the aforementioned '496 patent includes board faced with a glass mat comprising fiber glass filaments oriented in random pattern and bound together with an adhesive, for example, a resin binder, with the outer face of each of the glass mats being substantially free of set gypsum. Another preferred form of the gypsum board described in the '496 patent is one in which the set gypsum core of the board includes a water-resistant additive, for example, wax-asphalt emulsion, preferably in admixture with poly(vinyl alcohol).

In general, fibrous mat-faced board of the type described above has certain characteristics which are considered more desirable than those of paper-faced gypsum board. For example, the surface of fibrous mat-faced gypsum board is water-resistant whereas conventional paper cover sheets used to face gypsum board tend to soak up water and to delaminate upon becoming wet. Accordingly, the fibrous mat-faced board has much better weathering characteristics in outdoor applications than paper-faced gypsum board, particularly those forms of board which include a water-resistant additive in the gypsum core of the board. Unlike a paper cover sheet, a fibrous mat does not expand or contract during the manufacture of the board; this reduces cockle and permits the manufacture of board with uniform dimensions. These are but a few of the advantages of fibrous mat-faced board relative to conventional paper-faced board. New advantages are being realized as use of the fibrous mat-faced board is expanded into other applications.

A proposed use for fibrous mat-faced gypsum board is as a support member in a roofing application of the type known commonly as a "built-up-roof," often referred to as "BUR". A built-up-roof is a multi-ply structure which is formed in place and which comprises alternate layers of a hydrocarbon water-proofing material such as asphalt or tar and of sheets of roofing material such as sheets of felt or fiberglass, for example, two or three plies of each of the aforementioned. A BUR is typically topped off with stone or pebbles that adhere to the hydrocarbon water-proofing material. By way of example, a BUR can be fabricated by pouring hot asphalt onto a support member and applying to the hot liquid asphalt a layer of roofing felt in the form of sheets. This sequence of steps is repeated until the roof is built up to the desired extent and then stones or pebbles are added to the top layer of asphalt to which they adhere.

It is known to use as the support member onto which the first layer of hot liquid asphalt or similar material is poured a wood fiber, perlite, or paper-faced gypsum board. It has been recognized that fibrous mat-faced board has inherent characteristics that would seemingly make it more suitable for use as the support member in a BUR than heretofore used materials. However, it has been found that pouring hot asphalt onto the surface of a fibrous mat-faced gypsum board results in the formation in the asphalt of voids which remain in the solid asphalt layer which is formed upon cooling. (A similar phenomenon has been observed in the use of paper-faced gypsum board as a support member in a BUR.) It appears that the hot asphalt, which typically has a temperature of 400 to 450° F. or higher, causes residual water in the gypsum board to vaporize. The vaporized water penetrates through the facing material and into the hot asphalt where it tends to form blisters or bubbles which can burst. This leads to a defective ply in the built-up-roof.

One aspect of the present invention relates to the provision of a fibrous mat-faced gypsum board that can be used effectively as a support member in a built-up-roof.

There are other problems associated with fibrous mat-faced gypsum board, and they are problems that are more pronounced when the fibrous mat comprises glass fibers, particularly glass fibers in non-woven form. For example, the glass fibers can cause itching or other mild irritation of the skin as the board is handled. Also, glass fibers can become dislodged from the mat, become air-borne, and function as an irritant.

Another shortcoming of glass is that it tends to be degraded by alkaline materials. This restricts the use of glass mat-faced gypsum board in applications where, for example, an alkaline-based adhesive is applied to the glass mat for the purpose of adhering thereto an overlying material such as panels of insulation.

Other aspects of the present invention relate to the provision of an improved glass mat which has a reduced tendency to cause irritation to the skin and which has improved resistance to being degraded by alkaline materials.

SUMMARY OF THE INVENTION

In accordance with one aspect of this invention, there is provided a fibrous mat having a predetermined thickness and comprising fibers bound together with an adhesive and including also a reinforcing resinous binder on the surface of the mat and extending but partway through the thickness of the mat into the interstices thereof, the amount of reinforcing resinous binder being about 3 to about 40 g/square meter of mat.

An important aspect of the present invention is that the improved properties of the mat of the present invention can be achieved by the use of very small amounts of the reinforcing resinous binder, for example, preferred amounts being about 5 to about 15 g of resin/square meter of mat.

In accordance with another aspect of this invention, there is provided gypsum board comprising a set gypsum core having adhered to at least one of its surfaces a non-woven glass fiber mat having a predetermined thickness and comprising glass fibers bound together by an adhesive and including also a reinforcing resinous binder on the surface of the mat and extending but partway through the thickness of the mat into the interstices thereof, the amount of the binder being such that the drying characteristics of the board are substantially the same as board comprising said mat without said binder. An important aspect of this embodiment of the invention is that it is possible to manufacture gypsum board provided with the improved mat of the present invention on an industrial manufacturing line without having to adopt inefficient procedures for the purpose of accomodating the drying of the board, for example, raising oven temperatures and/or increasing oven size and/or slowing down the line speed of the manufacturing operation so that the board has a longer residence time in the oven. (It is noted that the industrial manufacture of gypsum board entails forming and shaping an aqueous gypsum slurry into a panel-like shape, maintaining such shape as the calcined gypsum sets and then accelerating the drying of the resulting board by subjecting it to elevated temperatures.) The use of an amount of reinforcing binder which significantliy deters the evaporation of water from the wet gypsum core through the mat would require the use of higher temperatures and/or longer residence times in order to maintain line speed or the use of slower line speeds while Maintaining standard temperatures and residence times. Remarkably, it has been found that the improved properties which are possessed by board of the present invention can be achieved by use of amounts of a reinforcing resinous binder which do not significantly change the drying characteristics of the board.

In preferred form, the mat comprises continuous or discrete strands or fibers of glass in non-woven for, which are bonded together by a resinous adhesive and the reinforcing resinous binder of the mat is alkaline-resistant.

In preferred form, the improved mat of the present invention is formed in situ during the manufacture of fibrous mat-faced gypsum board. Accordingly, another aspect of the present invention encompasses a process for manufacturing in continuous fashion a fibrous mat-faced gypsum board comprising:

(A) forming an aqueous slurry of calcined gypsum;
(B) continuously feeding said aqueous slurry onto an underlying, moving and supported facing sheet;
(C) forming said deposited slurry as it is carried on said moving sheet into a panel-like shape and maintaining said panel-like shape while said calcined gypsum sets to form a wet board;
(D) applying to the top surface of said panel-like shape of slurry an overlying porous fibrous mat of predetermined thickness and comprising fibers bound together by an adhesive;
(E) allowing said slurry to penetrate but partway into the thickness of said overlying mat so that the outer surface of said mat is substantially free of set gypsum;

(F) applying to the outer surface of said mat a reinforcing resinous binder which penetrates but partway into the thickness of said mat, the amount of binder so applied being such that the drying characteristics of the board are substantially the same as board comprising said mat without said binder; and
(G) drying the wet board, thereby forming board comprising a set gypsum core having adhered to one surface thereof said facing sheet and to the other surface thereof said mat.

In carrying out the process of the present invention, there is provided a gypsum board comprising a set gypsum core having at least one of its surfaces faced with an improved fibrous mat of the present invention, the mat being adhered to the core by set gypsum of the core which penetrates but partway through the thickness of the mat.

The present invention offers a number of advantages. For example, the reinforcing resinous binder, notwithstanding its being used in such small amounts, is effective in deterring the formation of voids in a layer of material formed by applying to the surface of the fibrous mat-faced gypsum board a water-proofing material in hot liquid form. This permits the gypsum board of the present invention to be used effectively as a support member in a built-up-roof. In addition, glass mat which includes the reinforcing resinous binder tends to cause less irritation to skin and the reinforcing resinous binder functions to keep the fibers from being dislodged readily from the mat. Another important advantage of the present invention is that presently-used industrial lines for manufacturing fibrous mat-faced gypsum board can be adapted readily with equipment for forming the improved mat of the present invention.

Other attributes of the present invention will become apparent from the following detailed description.

DETAILED DESCRIPTION OF THE INVENTION

The fibrous mat-faced gypsum board of the present invention comprises a set gypsum core which is basically the type of core used in those gypsum structural products which are known as gypsum wallboard, dry wall, gypsum board, gypsum lath and gypsum sheathing. The core of such a product is formed by mixing water with powdered anhydrous calcium sulfate or calcium sulfate hemihydrate ($CaSO_4 \cdot \tfrac{1}{2}H_2O$), also known as calcined gypsum, and thereafter allowing the mixture to hydrate or set into calcium sulfate dihydrate ($CaSO_4 \cdot 2H_2O$), a relatively hard material. The core of the product will in general comprise at least about 85 wt. percent of set gypsum.

The composition from which the set gypsum core is made can include optional constituents, including, for example, those included conventionally in fire-resistant gypsum board and in water-resistant gypsum board. Examples of such constituents include set accelerators, retarders, foaming agents, dispersing agents, water-resistant additives and fire-resistant additives.

For use as a support member for a built-up-roof, the core of the fibrous mat-faced gypsum board should Include a water-resistant additive, preferably in an amount such that the core absorbs no more than about 10% and preferably no more than about 5% water when tested in accordance with ASTM method C-473 with only the edges exposed. Any suitable water-resistant additive can be used. Numerous examples of such additives are disclosed in the aforementioned '496 patent. A preferred material for use in improving the water-resistant properties of the gypsum core comprises wax-asphalt emulsion, species of which are available commercially, as described also in the '496 patent. The amount of wax-asphalt emulsion used can be within the range of about 3 to about 10 wt. %, preferably about 5 to 7 wt. %. A particularly preferred mater a for use in improving the water-resistant properties of the gypsum core comprises a mixture of materials, namely, poly(vinyl alcohol) and wax-asphalt emulsion of the aforementioned type, as described in said '496 patent. The amounts of poly(vinyl alcohol) and wax-asphalt emulsion used should be at least about 0.05 wt. % and about 2 wt. % respectively. The preferred amounts of poly(vinyl alcohol) and wax-asphalt emulsion are about 0.15 to about 0.4 wt. % and about 3 to about 5 wt. % respectively. (Unless stated otherwise, the term "wt. %" when used herein means weight percent based on the total weight of the ingredients of the composition from which the set gypsum core is made, said ingredients including the water of the wax-asphalt emulsion, but not including additional amounts of water that are added to the gypsum composition for forming an aqueous slurry thereof.) A highly preferred water-resistant additive for use in the core of the gypsum-based board is an organopolysiloxane, for example, of the type referred to in U.S. Pat. Nos. 3,455,710; 3,623,895; 4,136,687; 4,447,498; and 4,643,771. Within this class of materials, poly(methyl-hydrogen-siloxane) is particularly preferred. The amount of the organopolysiloxane should be at least about 0.2 wt. %. A preferred amount falls within the range of about 0.3 to about 0.6 wt. %.

The improved fibrous mat of the present invention comprises a material which is capable of forming a strong bond with the set gypsum comprising the core of the gypsum board of the present invention. As disclosed in the aforementioned '496 patent, examples of such materials include a mineral type material such as glass fibers and synthetic resin fibers. The mat of the present invention is in non-woven form and includes fibers which are bound together by an adhesive and includes also a reinforcing resinous binder. The mat of the present invention is porous and can be made by treating a non-woven mat made up of adhesively-bound fibers with the reinforcing resinous binder. As described in detail below, the mat of the present invention is formed preferably during the manufacture of the fibrous mat-faced gypsum board.

In preferred form, the non-woven mat which is treated with the reinforcing resinous binder pursuant to the present invention is a glass mat comprising continuous or discrete strands of glass fibers adhesively bonded together, preferably by a resinous material. The mat can range in thickness, for example, from about 15 to about 40 mils, with a thickness of about 25 to about 35 mils being preferred. Such mats are known and are commercially available in many forms. In highly preferred form, the mat is a fiber glass mat comprising fiber glass filaments oriented in random pattern and bound together with a resin binder. Fiber glass mats of this type are commercially available, for example, those sold under the trademark DURA-GLASS by Manville Building Materials Corporation and those sold by ELK Corporation as BUR or shingle mat.

The reinforcing resinous binder that is applied to the aforementioned fibrous mat can be any polymeric material that is capable of adhering strongly to the mat, and is preferably a material that is considered by the art to be water-resistant and heat-resistant and, most preferably, alkaline-resistant also. It is desirable also that the resin have anti-blocking characteristics. There are many commercially-available resins that possess the aforementioned characteristics. The binder can comprise a single resin or a mixture of resins and can be a thermoplastic or a thermoset resin. For most applications, the binder is likely to be a resin which is different from the adhesive which holds together the fibers of the mat. However, the same resin can be used for the reinforcing binder and for the adhesive.

The reinforcing resinous binder is preferably applied to the fibrous mat in the form of an aqueous dispersion of resin solids, that is, a latex. Because of the relatively small amount of resin used to treat the mat, it is recommended that a commercially-available latex be diluted prior to applying the latex to the mat. Good results have been achieved with latexes that have been diluted to the extent that the solids contents thereof are about 5 to about 25 wt. %.

The fibrous mat is most desirably treated with substantially 100% of the resin. However, it should be understood that other materials which are compatible with the resin and which do not interfere with the coalescence of the resin particles or desired properties of the mat can be used also. Examples of such materials include pigments, lubricants, and fillers such as silicates, silica, gypsum and calcium carbonate. The amount of such other materials can comprise up to about 75 wt. % of a composition comprising the resin and other materials. However, when such other materials are used, it is preferred that they comprise not more than about 25 wt. % of the composition.

A preferred reinforcing resin binder for use in the practice of the present invention is available in the form of a latex sold by Unocal Chemicals Division of Unocal Corporation under the mark 76 RES 1018. The pH and solids content of the latex are, respectively, 7.5–9.0 and 50%. The resin is styrene-acrylic copolymer which has a relatively low film-forming temperature (20° C.) and a Tg of 22° C. Coatings formed from the resin can be dried effectively at temperatures within the ranges of about 300 to 400° F. If desired, a coalescing agent can be used to lower the film-forming temperature.

Another preferred reinforcing resin binder for use in the practice of the present invention is also available in the form of a latex sold by Unocal Chemicals Division of Unocal Corporation. This preferred latex is sold under the mark 76 RES 2302. The pH and solids content of the latex are, respectively, 3.5 and 45%. The resin is a self-crosslinking vinyl acetate-acrylic copolymer which has a Tg of about 33° C.

As mentioned above, the amount of reinforcing resin binder applied to the surface of the fibrous mat is relatively small, for example, so small that to the naked eye it is difficult, if not impossible, to detect differences between the untreated and the binder-treated mat. Nevertheless, the use of such small amount of binder is effective in imparting desired properties to the mat, as described above. The reasons for this are not understood. Particularly perplexing is determining the reason why such small amounts of binder are effective in inhibiting the formation of bubbles and/or voids in a layer of hydrocarbon water-proofing material that is formed by the solidification of the material in hot liquid form on the surface of the treated fibrous mat-faced board.

The minimum amount of reinforcing resinous binder to apply to the fibrous mat is that which results in detectable improvements in the desired properties of the mat. In quantitative terms, it is recommended that the binder be applied in an amount of at least about 3, and preferably at least about 5, g/square meter of mat. Several factors can be taken into consideration in determining the maximum amount of binder to use. As mentioned above, manufacturing considerations dictate that the binder should be present in an amount such that the drying characteristics of the board are not changed substantially. In addition, these should be avoided amounts which tend to interfere with characteristics of the substantially gypsum-free surface of the mat that are considered desirable for particular applications. Such characteristics include both aesthetic and functional characteristics. In connection with functional characteristics, it is noted that a mat which is substantially free of set gypsum is highly textured and provides an excellent substrate for adhering thereto an overlying component inasmuch as it comprises many interstices into which an adhesive composition can flow and bind. Amounts of reinforcing resinous binder which would eliminate this characteristic should be avoided. Other factors which influence the maximum amount of reinforcing resinous binder that is used include a levelling off of or elimination of improvements in properties notwithstanding the use of increased amounts of the binder. Amounts of binder which cause blocking should be avoided also. It is believed that for most applications, it will not be necessary to apply more than about 25 g of resin per square meter of mat, but higher amounts can be used, as mentioned above. A preferred amount of binder to use with the preferred glass mat of the present invention is about 5 to about 15 g/square meter of mat, with particularly good results being achieved with the use of about 10 to about 15 g/square meter of mat.

The reinforcing resinous binder can be applied to the mat by any suitable means, for example, spray, brush, curtain coating, and roller coating. The means used to apply the binder will generally depend on the form of the binder, for example, whether it is in solid or liquid form (dissolved, dispersed or suspended). Spray has been used very effectively when applying the binder in the form of a latex.

As mentioned above, an important feature of the present invention is that the improved fibrous mat-faced gypsum board can be made utilizing an existing, but readily-modified manufacturing line for applying the reinforcing resinous binder to the surface of the mat. In conventional fashion, dry ingredients from which the gypsum core is formed are pre-mixed and then fed to a mixer of the type commonly referred to as a pin mixer. Water and other liquid constituents used in making the core are metered into the pin mixer where they are combined with the dry ingredients to form an aqueous gypsum slurry. Foam is generally added to the slurry in the pin mixer to control the density of the resulting core. The slurry is dispersed through one or more outlets at the bottom of the mixer onto a moving sheet which is indefinite in length and is fed from a roll thereof. The sheet forms one of the facing sheets of the board. In preferred form, the sheet is a fibrous mat like that which is applied subsequently to the top of the slurry.

As is common practice in the manufacture of conventional paper-faced gypsum board, the two opposite edge portions of the sheet are progressively flexed upwardly from the mean plane thereof and then turned inwardly at the margins as to provide coverings for the edges of the resulting board.

A sheet of fibrous mat to which the reinforcing resinous binder is to be applied is fed from a roll onto the top of the slurry, thereby sandwiching the slurry between the two moving sheets which form the facings of the set gypsum core which is formed from the slurry. Conventional shaping rolls and edge guiding devices are used to shape and maintain the edges of the composite until the gypsum has set sufficiently to retain its shape.

In preferred form, the reinforcing resinous binder in the form of a diluted latex is applied uniformly to the surface of the fibrous mat by a multiplicity of spray heads which are positioned over the mat and across the width thereof. The surface of the mat to which the binder is applied is substantially free of set gypsum and comprises many interstices into which the binder can flow and bond. The formation of the board with the facing mat being substantially free of gypsum can be accomplished by known means, for example, by adjusting the viscosity of the gypsum slurry so that it penetrates but partway into the overlying fibrous mat, for example, up to about 30 to 70% of its thickness over the entire surface areas thereof.

It is believed that, for many applications, it will be most advantageous to manufacture board having both surfaces faced with a fibrous mat, with each mat having a substantially gypsum-free surface. The recommended known means for controlling the viscosity of the slurry is to add thereto a viscosity-control agent. Such viscosity-control agents are known in the field of gypsum board manufacture. A preferred viscosity-control agent is paper fiber. Examples of other agents that can be used are cellulosic thickeners, bentonite clays and starches. The particular viscosity values that are used in manufacturing operation can vary from one application to the next, depending on the porosity of the mat, and the desired penetration of the slurry. Accordingly, for any particular application, the viscosity value is best determined empirically.

In using the preferred form of glass fiber mat, as described above, to manufacture the aforementioned preferred forms of board, it is recommended that the gypsum slurry have a viscosity within the range of about 5000 to about 7000 cp. As used herein, the viscosity value refers to Brookfield viscosity measured at a temperature of 70° F. at 10 rpm utilizing paddle No. 3. It should be appreciated that the amount of viscosity-control agent added to the slurry to give the desired viscosity will vary depending on the particular agent used and the specific viscosity desired.

The reinforcing resinous binder can be applied at that stage of the manufacturing process at which the gypsum has set partially and to the extent that it is in a non-flowable form. Preferably, the binder is applied to the surface of the mat when the gypsum has set completely, but at a time prior to the drying of the board. Typically, the binder will be present in those portions of the mat that are not occupied by set gypsum, with the highest concentration of binder being at the surface of the mat.

After application of the binder, sequential lengths of the board are cut and further processed by exposure to heat which accelerates the drying of the board by increasing the rate of evaporation of excess water in the gypsum slurry and water of the latex.

As mentioned above, the amount of the reinforcing resinous binder can be such that the drying characteristics of the board are substantially the same as board faced with mat that does not include the binder. (It is believed that the porosity characteristics of the mat are not significantly changed.) This means that industrial drying conditions typically used in continuous gypsum board manufacture can be used in the manufacture of board of the present invention. Exemplary drying conditions include temperatures of about 200 to about 600° F., drying times of about 30 to about 60 minutes, and line speeds of about 70 to about 250'/minute.

It is believed that the form of the board that will be used most widely is board that has but one of its fibrous facings treated with the reinforcing resinous binder. However, both fibrous facings of the board can include the binder in accordance with the present invention. One way of making such board is to first apply the binder to one of the fibrous facings in the manner described above and thereafter applying binder to the other facing after the board has been dried.

Thus, improved gypsum board can be provided by use of a mat having a predetermined thickness and comprising fibers and resinous adhesive material which holds the fibers together, the amount of adhesive material being substantially the same throughout a first portion of the mat which extends from one surface thereof to about 30% to about 70% of the thickness thereof and the amount of adhesive material being greater in a second portion of the mat comprising the remaining mat thickness, the amount of the adhesive material in said second portion varying, with the highest proportion thereof being present at the other surface of the mat. The aforementioned amounts are on the basis of amount of resin per unit volume of mat.

Examples which follow are illustrative of the present invention.

EXAMPLES

This example is illustrative of a fibrous mat-faced gypsum board which has a water-resistant core and which can be used as a support member in a built-up-roofing structure in accordance with the present invention.

The formulation set forth below is an example of an aqueous gypsum slurry which can be used in making the core of a gypsum board faced with an improved fibrous mat of the present invention.

| Constituents | Lbs./1000 sq.ft. of Board |
| --- | --- |
| calcined gypsum (CaSO.1/2 H$_2$O) | 1380 |
| wax/asphalt emulsion, water-resistant additive | 130 |
| aqueous solution of 10 wt. % poly(vinyl alcohol), water-resistant additive | 56 |
| paper fiber | 15 |
| set accelerator | 6 |
| ammonium lauryl sulfonate foaming agent | 1 |
| calcium lignosulfonate, dispersing agent | 2 |
| water | 1,000 |

The wax/asphalt emulsion of the above formulation contains approximately 48 wt. % solids of which about 11 wt. % is paraffin wax and about 37 wt. % is asphalt. The set accelerator comprises about 80 wt. % potash, about 12 wt. % lignosulfonate and about 8 wt. % ground gypsum.

The above formulation is used to prepare gypsum board, the surfaces of which are covered with non-woven fiber glass mat. The mat is composed of glass fiber filaments oriented in a random pattern bonded together by an adhesive referred to by the manufacturer as a "modified urea-formaldehyde resin". The mat has a thickness of 33 mils and is more porous than paper of the type used as the cover sheet of gypsum wallboard. The air permeability of the mat is 700 CFM/sq.ft. (test method FG 436-910). The mat is available commercially as DURA-GLASS 7502-2 lbs. and is an example of a preferred glass mat for use in the practice of the present invention.

Continuous length board is made from the above gypsum slurry and glass fiber mat on a conventional wallboard machine. The viscosity of the gypsum slurry and the porosity of the glass fiber mat are such that the surfaces of both glass fiber mats which form the facings of the board are substantially free of set gypsum, with portions of set gypsum of the core penetrating about 50% of the thickness of the overlying mat.

Prior to the cutting and the drying of the board and when the gypsum has set completely, there is sprayed onto the surface of the overlying glass mat an aqueous dispersion of UNOCAL 76 RES 2302 latex that is diluted with water from its normal 45% solids content to 10% solids. The aqueous dispersion of resin is sprayed onto the surface of the mat at 40 lbs./sq. inch pressure and at a rate of 0.4 gallon/minute as the conveyor belt carrying the gypsum board travels at a speed of 85 ft./min. Four 95°-angle spray tips are used to apply the resin dispersion uniformly to the glass mat, depositing thereon about 2.2 lbs. of resin per 1000 sq.ft. of mat (about 11 g of resin per square meter of mat). The resin penetrates about 50% of the thickness of the mat.

After application of the resin dispersion, the board is cut into 8 ft. lengths and thereafter the board segments are placed in an oven having a temperature of about 400° F. for about 30 mins. and until the board is almost dry, and then at 200° F. for about 15 mins. until it is dried completely. The density of the board is about 48 lbs./cu.ft.

For the purpose of evaluation, the dried board is rubbed by hand. The fibers of the treated mat are more resistant to removal than the fibers of untreated mat.

There is applied to the surface of the treated glass mat hot liquid asphalt having a temperature of about 400° F. The asphalt is allowed to cool and solidify into a solid film having a thickness of about 3/16 inch. The film is continuous and has no bubbles or voids. The same procedure is followed, except that hot liquid asphalt is poured onto the surface of an untreated mat. The solifified film has blisters and voids in it over about 40% of its surface.

In another evaluation, contact adhesive is applied to the surfaces of both treated and untreated glass mat facings of gypsum boards. The untreated mat soaks up the contact adhesive quickly. In contrast, the contact adhesive placed on the mat treated with the reinforcing resinous binder remains on the surface to a much greater extent. This is advantageous in that lower amounts of adhesive can be used and bond strength to overlying materials is improved.

Tensile strength tests have been conducted on gypsum board faced with a glass mat formed from glass fibers having a diameter of 16 microns. The tests included evaluation of untreated glass mat and glass mat treated with a reinforcing resinous binder (the resin of the aforementioned 76 RES 2302 latex) in an amount of about 11 g/square meter. Specimens of expanded polystyrene foam were adhered to the surfaces of the untreated and treated mats by a water-based acrylic adhesive. The bond between the foam and treated mat was about 25% stronger than the bond between the foam and the untreated mat.

In summary, it can be said that the present invention provides a unique, practical, and economical way to improve the properties of fibrous mat-faced gypsum board and to overcome or mitigate problems associated with the fibrous facing thereof, particularly glass type facing of the non-woven type. The reinforcing resinous binder functions to help keep intact fibers that otherwise tend to become airborne as the board is handled and installed by the hammering of nails or with a screw gun. It functions also to protect the skin from being irritated by glass fibers which can be abrasive. It makes it possible to use such board effectively in built-up-roofing applications and it provides an improved surface for adhering thereto overlying structural elements.

I claim:

1. A gypsum board comprising a gypsum core and a fibrous mat adhered to at least one surface of said core by set gypsum of the core penetrating but part-way through the thickness of the mat such the at least a portion of the outer surface of said mat is substantially free of set gypsum, said mat comprising tibers bound together with an adhesive and including also a reinforcing resinous binder on at least said substantially gypsum-free surface of said mat.

2. A gypsum board according to claim 1 wherein each of said sheet and said mat comprises fiber glass filaments oriented in substantially random pattern and wherein said adhesive comprises resin.

3. A gypsum board according to claim 1 wherein said reinforcing resinous binder is present in an amount of from about 3 to about 40 g/square meter of mat.

4. A gypsum board according to claim 3 wherein said resinous binder is present in an amount of from about 5 to about 15 g/square meter of mat.

* * * * *

UNITED STATES PATENT AND TRADEMARK OFFICE
CERTIFICATE OF CORRECTION

PATENT NO.: 5,981,406

DATED: November 9, 1999

INVENTOR: Brian G. RANDALL

It is certified that errors appear in the above-identified patent and that said Letters Patent is hereby corrected as shown below:

On the cover page, under "FOREIGN PATENT DOCUMENTS", line 34, delete "2103563" and insert --2013563--.

In Claim 1, column 11, line 2, delete "the" (second occurrence) and insert --that--.

line 4, delete "tibers" and insert --fibers--.

Signed and Sealed this

Nineteenth Day of September, 2000

Attest:

Q. TODD DICKINSON

*Attesting Officer*      *Director of Patents and Trademarks*